(12) United States Patent
Glover et al.

(10) Patent No.: US 10,664,170 B2
(45) Date of Patent: May 26, 2020

(54) PARTIAL STORAGE OF LARGE FILES IN DISTINCT STORAGE SYSTEMS

(71) Applicant: MICROSOFT TECHNOLOGY LICENSING, LLC, Redmond, WA (US)

(72) Inventors: Andrew K. Glover, Bellevue, WA (US); Jose A. Barreto, Redmond, WA (US); Ronakkumar N. Desai, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 522 days.

(21) Appl. No.: 15/379,467

(22) Filed: Dec. 14, 2016

(65) Prior Publication Data

US 2018/0165018 A1    Jun. 14, 2018

(51) Int. Cl.
*G06F 3/06* (2006.01)
*G06F 16/182* (2019.01)
(Continued)

(52) U.S. Cl.
CPC .......... *G06F 3/0611* (2013.01); *G06F 3/067* (2013.01); *G06F 3/0643* (2013.01); *G06F 16/13* (2019.01);
(Continued)

(58) Field of Classification Search
CPC ........... G06F 16/9574; H04L 2463/101; H04L 29/06; H04L 41/12; H04L 41/5003;
(Continued)

(56) References Cited

U.S. PATENT DOCUMENTS

| 4,638,424 A | * | 1/1987 | Beglin | G06F 12/08 711/112 |
| 4,871,903 A | * | 10/1989 | Carrell | B07C 3/00 235/375 |

(Continued)

FOREIGN PATENT DOCUMENTS

| WO | 2004084523 A1 | 9/2004 |
| WO | 2012005609 A1 | 1/2012 |

OTHER PUBLICATIONS

Shukla, Ankur, "How to Split a Large PDF into Multiple Files up to 100 MB", http://www.geekyedge.com/how-to-split-a-large-pdf-into-multiple-files-up-to-100-mb/, Published on: Mar. 26, 2016, 6 pages.

(Continued)

*Primary Examiner* — Shyue Jiunn Hwa
(74) *Attorney, Agent, or Firm* — Michael Best & Friedrich LLP

(57) ABSTRACT

Variety of approaches to provide partial storage of large files in distinct storage systems are described. A storage service initiates operations to provide storage of large files by determining a rapid access portion and a slow access portion of a file. The rapid access portion of the file is stored in a rapid access storage system and the slow access portion of the file (or an entirety of the file) is stored in a slow access storage system. In response to an access request to the file, the rapid access portion of the file is provided from the rapid access storage system. Next, the slow access portion of the file is retrieved from the slow access storage system to be provided while providing the rapid access portion of the file.

19 Claims, 7 Drawing Sheets

(51) Int. Cl.
*G06F 16/17* (2019.01)
*G06F 16/13* (2019.01)

(52) U.S. Cl.
CPC ........ *G06F 16/1727* (2019.01); *G06F 16/182* (2019.01)

(58) Field of Classification Search
CPC ... H04L 41/5009; H04L 41/507; H04L 43/06; H04L 43/0829; H04L 43/0852; H04L 43/0864; H04L 63/08; H04L 65/4076; H04L 65/4084; H04L 67/104; H04L 67/306; H04L 67/325; H04L 69/329
See application file for complete search history.

(56) References Cited

U.S. PATENT DOCUMENTS

| | | | | |
|---|---|---|---|---|
| 5,568,181 | A * | 10/1996 | Greenwood | ....... H04N 7/17336 725/92 |
| 6,061,733 | A | 5/2000 | Bodin et al. | |
| 6,502,106 | B1 * | 12/2002 | Gampper | ............ G06F 16/9574 709/202 |
| 7,908,302 | B1 | 3/2011 | Nagaralu et al. | |
| 8,064,463 | B1 * | 11/2011 | Selby | .................... H04L 47/762 370/395.41 |
| 2003/0069881 | A1 | 4/2003 | Huttunen | |
| 2003/0163457 | A1 | 8/2003 | Yano et al. | |
| 2006/0248317 | A1 * | 11/2006 | Vorbach | .............. G06F 15/7867 712/221 |
| 2006/0259728 | A1 | 11/2006 | Chandrasekaran et al. | |
| 2008/0052319 | A1 | 2/2008 | Dunning et al. | |
| 2011/0191534 | A1 * | 8/2011 | Ash | ..................... G06F 12/0804 711/113 |
| 2012/0110040 | A1 | 5/2012 | Prasad | |
| 2013/0042156 | A1 | 2/2013 | Srinivasan et al. | |
| 2014/0280403 | A1 | 9/2014 | Swansegar et al. | |
| 2014/0304384 | A1 | 10/2014 | Varenhorst et al. | |
| 2016/0219092 | A1 | 7/2016 | Tapia et al. | |

OTHER PUBLICATIONS

"International Search Report and Written Opinion Issued in PCT Application No. PCT/US2017/065211", dated Mar. 13, 2018, 15 Pages.

* cited by examiner

PARTIAL STORAGE OF LARGE FILES IN DISTINCT STORAGE SYSTEMS

BACKGROUND

Information exchange have changed processes associated work and personal environments. Automation and improvements in processes have expanded scope of capabilities offered for personal and business consumption. With the development of faster and smaller electronics, execution of mass processes at cloud systems have become feasible. Indeed, applications provided by data centers, data warehouses, data workstations have become common features in modern personal and work environments. Such systems execute a wide variety of applications ranging from enterprise resource management applications to storage management tools.

Increasingly, cloud storage providers are utilized for storing and/or sharing content across multiple clients, where the cloud storage providers have engines that automatically synchronize the content between the clients and cloud storage. However, there are currently significant gaps when managing long term storage of large files. Storage resources are unnecessarily consumed to manage large files that are seldom accessed. Lack of relevant storage technologies lead to poor management of storage resources when storing and providing access to large files.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to partial storage of large files in distinct storage systems. A storage service, according to embodiments, may initiate operations to provide storage of large files by determining a rapid access portion and a slow access portion of a file. The rapid access portion of the file may be stored in a rapid access storage system and the slow access portion of the file or the entirety of the file may be stored in a slow access storage system. Upon receiving an access request to the file, the rapid access portion of the file may be provided from the rapid access storage system. Furthermore, the slow access portion of the file may be retrieved from the slow access storage system to be provided while providing the rapid access portion of the file. The slow access storage system may replace demand for the fast access storage system and as such provide resource savings in relation to the fast access storage system.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
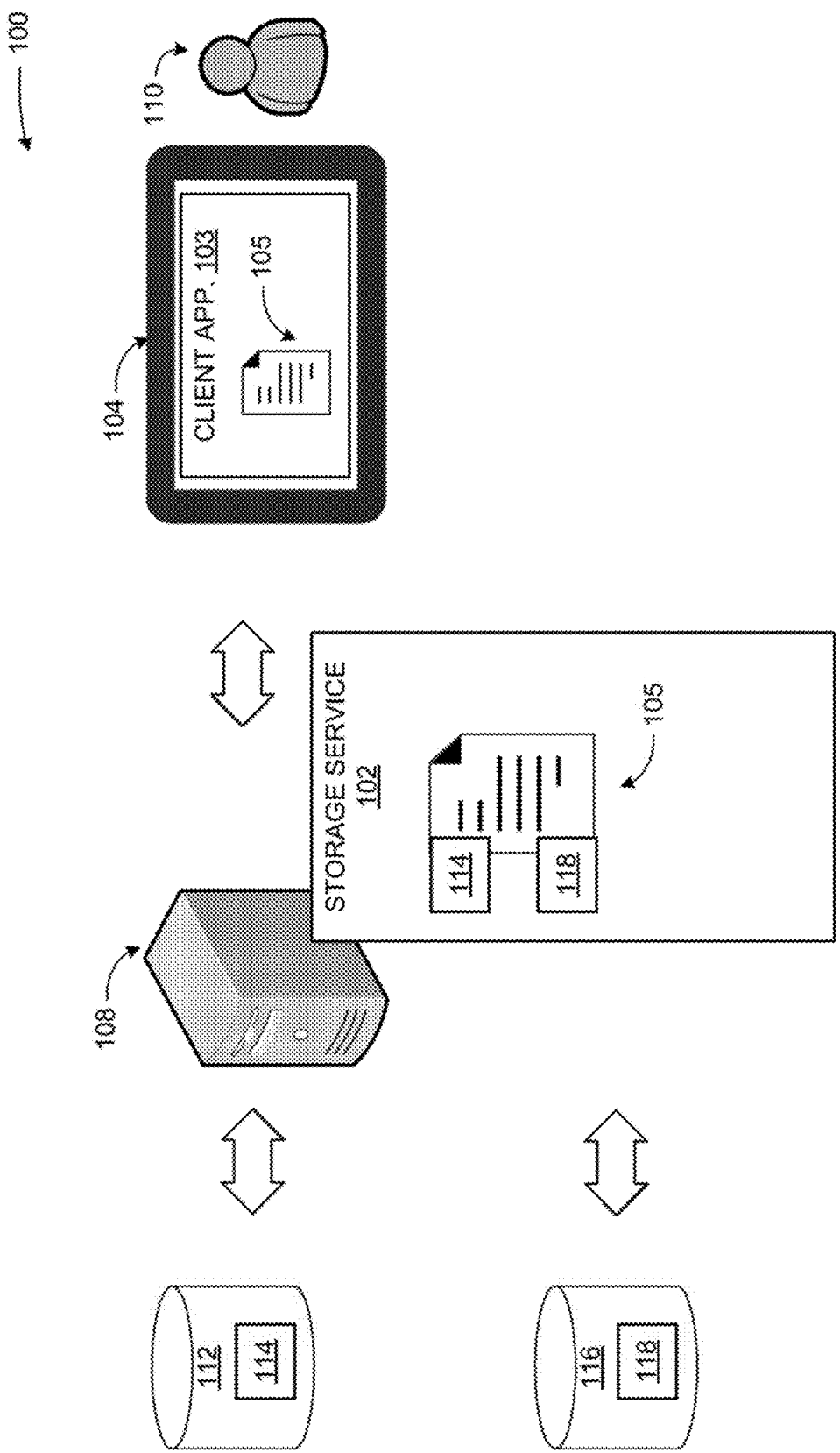
FIG. 1 is a conceptual diagram illustrating examples of providing partial storage of large files in distinct storage systems, according to embodiments.

As briefly described above, a storage service may provide partial storage of large files in distinct storage systems. In an example scenario, the storage service may determine a rapid access portion and a slow access portion of a file. The rapid access portion of a file may be a head section of a file used to stream the file to a file requester while the slow access portion of the file (such as a tail section) or the entirety of the file may be retrieved for streaming to the file requester. The rapid access portion of the file may be stored in a rapid access storage system and the slow access portion of the file or the entirety of the file may be stored in a slow access storage system.

In an example scenario, a cloud based file storage scheme may balance file access and storage by dividing a file to a rapid access portion and a slow access portion. The rapid access portion may be stored in a rapid access storage system such as a local file storage. The slow access portion may be stored in a slow access storage system such as an external file storage. Alternatively, the entirety of the file may be stored in the slow access storage system. Retrieving the slow access portion (or the entirety of the file) may take longer than accessing the rapid access portion. As such, upon receiving a request for the file, retrieval of the slow access portion (or die entirety of the file) may be started to continue streaming the file to the requester after streaming the rapid access portion.

In response to an access request to the file, the rapid access portion of the file may be provided. The rapid access portion of the file may be retrieved from the rapid access storage system and streamed to the requester. Next, the slow access portion of the file or the entirety of the file) may be retrieved from the slow access storage system to be provided while providing the rapid access, portion of the file (or the entirety of the file). Another example of the rapid access storage system may include a solid state drive based storage solution compared to a slow access storage system such as a hard disk or a tape based storage solution. The rapid access storage system and the slow access storage system may also be differentiated based on access lag to retrieve respective portions stored by the systems. For example, the rapid access storage system may provide the rapid access portion of the file within an access lag under a lag threshold. The slow access storage may provide the slow access portion of the file (or the entirety of the file) within an access lag that exceeds the lag threshold.

In some examples, notifications from client applications may be utilized in prefetching slow access portion(s) of file(s) or entire file(s) stored in a slow access storage system. This may include inference or explicit notification of the service. For the explicit notification, an example scenario may include a new installation of a cloud storage service's synchronization client application on a computer. If the client application knows it will be pulling down all of the content that the user has stored in the storage service, it may signal to the service that the service should execute a pull of all data from the slow access storage system.

In the following detailed description, references are made to the accompanying drawings that form a part hereof, and in which are shown by way of illustrations, specific embodiments, or examples. These aspects may be combined, other aspects, may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing partial storage of large files in distinct storage systems. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 is a conceptual diagram illustrating examples of providing partial storage of large files in distinct storage systems, according to embodiments.

In a diagram 100, a server 108 may execute a storage service 102. The server 108 may include a physical server providing service(s) and/or application(s) to client devices. A service may include an application performing operations in relation to a client application and/or a subscriber, among others. The server 108 may include and/or is part of a workstation, a data warehouse, a data center, and/or a cloud based distributed computing source, among others.

The server 108 may execute the storage service 102. The storage service 102 may initiate operations to store large files by determining a rapid access portion 114 and a slow access portion 118 of a file 105. An example of the file may include a video file, an audio stream, a compressed file container, among others. The rapid access portion 114 of the file 105 may be a head section of the file 105 used to stream the file 105 to a file requester 110 while the slow access portion 118 of the file 195 (such as a tail, section) may be retrieved for streaming to the file requester 110. The rapid access portion 114 of the file 105 may be stored in a rapid access storage system 112. The slow access portion 118 of the file 105 may be stored in a slow access storage system 116. Alternatively, an entirety of the file 105 may be stored in the slow access storage system 116.

In an example scenario, the storage service 102 may execute in the physical service 108 as a part of a cloud based file storage scheme. The storage service 102 may balance file access and storage by dividing the file 105 to the rapid access portion 114 and the slow access portion 118. The rapid access portion 114 may be stored in the rapid access storage system 112 such as a local file storage. The slow access portion 118 (or the entirety of the file 105) may be stored in the slow access storage system 116 such as an external file storage. Retrieving the slow access portion 118 (or the entirety of the file 105) may take longer than accessing the rapid access portion 114. As such, upon receiving a request for the file 105, retrieval of he slow access portion 118 (or the entirety of the file 105) may be started to continue streaming the file to the file requester 110 after streaming the rapid access portion 114. The rapid and slow access portions (114 and 118) may be streamed to a client application 103 executing on a client device 104 to provide the file 105 to the file requester 110.

The storage service 102 may select to divide the file 105 to slow and rapid access portions (114 and 118). For example, the storage service 102 may divide video streams, compressed file containers, among other files to slow and rapid access portions (114 and 118).

In response to an access request to the file 105, the rapid access portion 114 of the file 105 may be provided. The rapid access portion 114 of the file 105 may be retrieved from the rapid access storage system 112 such as a local storage and streamed to the file requester 110. Next, the slow access portion 118 of the file 105 may be retrieved from the slow access storage system 116 to be provided while providing the rapid access portion 114 of the file 105. Alternatively, the entirety of the file 105 may be stored in the slow access storage system 116 and retrieved upon receiving the file request for streaming. The entirety of the file 105 may be streamed in conjunction with the rapid access portion 114 of the file 105. Alternatively, if download bandwidth provided by the slow access storage system is sufficient to address the file request, the entirety of the file 105 may be retrieved from the slow access storage system and streamed without using the rapid access portion 114 of the file 105.

Another example of the rapid access storage system 112 may include a solid state drive based storage solution which provides on demand access to the rapid access portion 114 of the file 105 compared to a slow access storage system 116 such as a hard disk or a tape based storage solution. The rapid access storage system 112 and the slow access storage system 116 may also be differentiated based on access lag to retrieve respective portions stored by the systems. For example, the rapid access storage system 112 may provide the rapid access portion 114 of the file 105 within an access lag under a lag threshold. The slow access storage system 116 may provide the slow access portion 118 of the file 105 within an access lag that exceeds the lag threshold.

The server 108 may communicate with the client device 104 and/or the client device 113 through a network. The network may provide wired or wireless communications between network nodes such as the client device 104 and/or the server 108, among others. Previous example(s) to provide partial storage of large files in distinct storage systems are not provided in a limiting sense. Alternatively, the storage service 102 may provide the rapid and slow access portions (114 and 118) of the file 105 as a desktop application, a workstation application, and/or a server application, among others. The client application 103 may also include a client interface of the storage service 102.

The file requester 110 may interact with the client application 103, respectively, with a keyboard based input, a mouse based input, a voice based input, a pen based input, and a gesture based input, among others. The gesture based input may include one or more touch based actions such as a touch action, a swipe action, and a combination of each, among others.

While the example system in FIG. 1 has been described with specific components including the server 108, the storage service 102, embodiments are not limited to these components or system configurations and can be implemented with other system configuration employing fewer or additional components.

Figure 2:
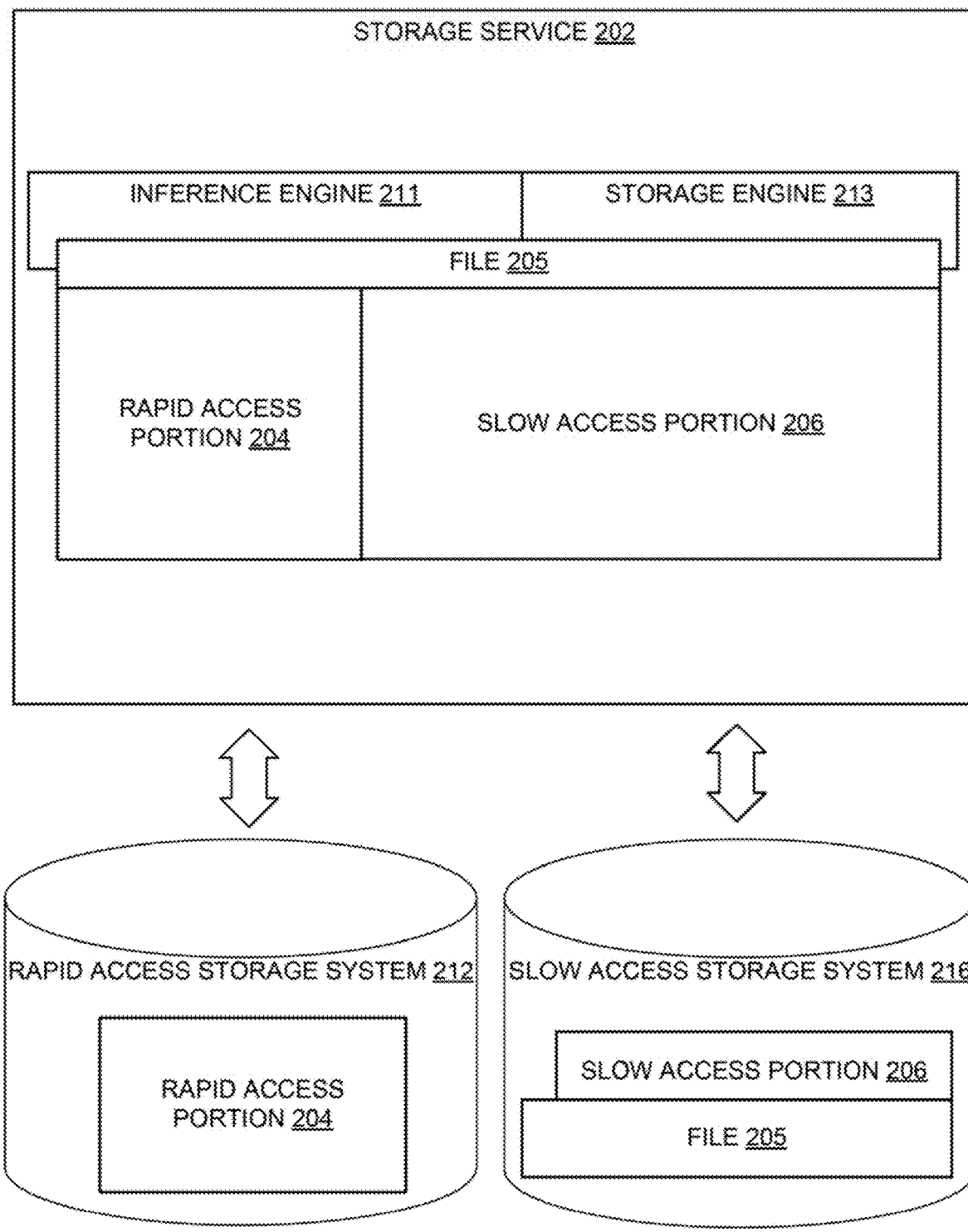
FIG. 2 is a display diagram illustrating example components of a storage service that provides partial storage of large files in distinct storage systems, according to embodiments.

FIG. 2 is a display diagram illustrating example components of a storage service that provides partial storage of large files in distinct storage systems, according to embodiments.

As illustrated in diagram 200, an inference engine 211 of a storage service 202 may determine a rapid access portion 204 of a file 205 and a slow access portion 206 of the file 205. The inference engine 211 and a storage engine 213 of the storage service 202 may balance access vs storage based on performance and resource consumption demand by partitioning the file 205 for storing rapid and slow access portions (204 and 206) in different storage solutions. The inference engine 211 may select to divide the file 205 based on a size of the file 205 and a last access time of the file 205. For example, the storage engine 213 may divide the file 205 to the rapid and slow access portions (204 and 206) upon detecting the size of the file 205 exceed a file size threshold such as 10 MB, 100 MB, and/or 1 GB, among others. Alternatively, the rapid access portion 204 and the file 205 may be stored in different storage solutions.

The rapid access portion 204 may be stored in a rapid access storage system 212. An example of the rapid access storage system 212 may include a local storage solution that provides the rapid access portion 204 on demand. For example, in response to a file request the file 205, the storage engine 213 may retrieve the rapid access portion 204 from the rapid access storage system 212 and start streaming the rapid access portion 204 while retrieving the slow access portion 206 (or the file 205 from a slow access storage system 216.

The slow access portion 206 (or the file 205) ma be stored in a slow access storage system 216 to conserve storage resources while hosting the file 205. For example, the slow access storage system 216 may include an external storage solution with vast storage capacity that decreases a cost of hosting the file 205. However, the slow access storage system 216 may provide limited and/or restricted access to the slow access portion 206 (or the file 205) because of lag involved in accessing the slow access portion 206. As a hybrid hosting solution, the inference engine 211 may stream the rapid access portion 204 of the file 205 (upon a file request) while retrieving the slow access portion 206 (or the file 205) for delivery upon streaming the rapid access portion 204.

An example of the rapid access storage system 212 may include a storage solution based on solid state drive(s), raid array(s), and/or among others. An example of the slow access storage system 216 may include a storage solution based on hard disk drive(s), and/or tape based solution(s), among others. The rapid and slow access storage systems (212 and 216) may include distributed storage solutions such as cloud based systems.

In an example scenario, upon providing the slow access portion 206 (or the file 205), the storage engine 213 may store the slow access portion 206 (or the file 205) in the rapid access storage system 212 for an expected access period in response to detecting one or more access requests to the file before an expected access period. The expected access period may be a static or a dynamic value based on usage demands or system settings associated with access to the file 205. In response to detecting no access requests to the file for the expected access period following the storage of the slow access portion 206 (or the file 205) in the rapid access storage system 212, the slow access portion 206 (or the file 205) may be stored in the slow access storage system 216.

Figure 3:
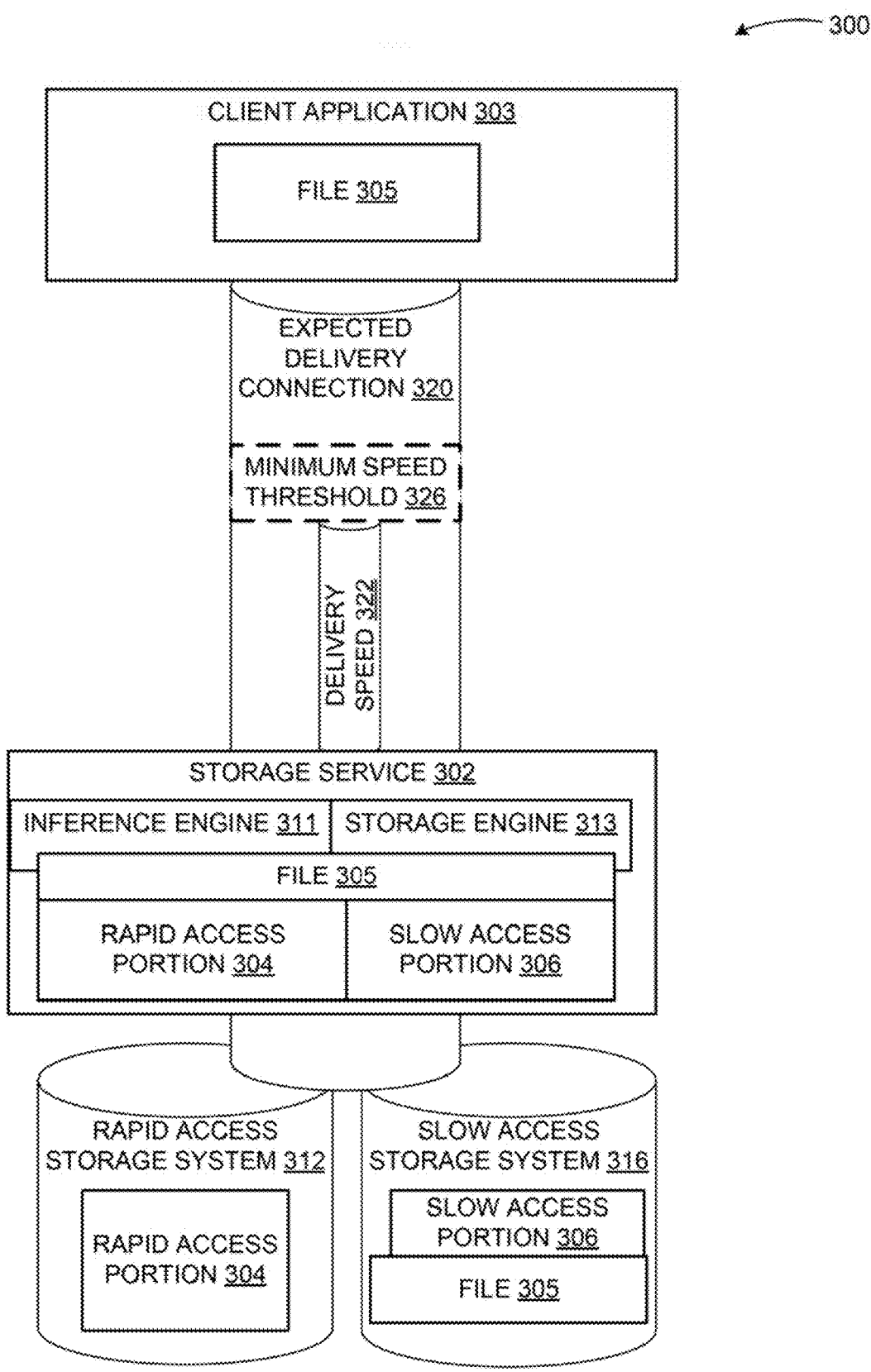
FIG. 3 is a display diagram illustrating components of a scheme to provide partial storage of large files in distinct storage systems, according to embodiments.

FIG. 3 is a display diagram illustrating components of a scheme to provide partial storage of large files in distinct storage systems, according to embodiments.

As shown in a diagram 300, an inference engine 311 and a storage engine 313 of a storage service 302 may, establish an expected delivery connection 320 with a client application 303 for delivery of a file 305 upon receiving a file request. The expected delivery connection 320 may be managed to maintain the expected delivery connection 320 and prevent a disconnect failure. The expected delivery connection 320 may also be managed to provide an uninterrupted delivery of the file 305. For example, a stream bit rate may be maintained to provide an uninterrupted stream of a video file (as the file 305) to the client application 303.

In an example scenario, the storage engine 313 may adjust a delivery speed 322 of a rapid access portion 304 and a slow access portion 306 of the file 305 (or the entirety of the file 305) such that a delay in delivery is not detectable. For example, the inference engine 311 may identify the minimum speed threshold 326 for providing an uninterrupted delivery of the file 305. An example of the uninterrupted delivery of the file 305 may be dependent on a minimum streaming speed property of the file 305 and a bandwidth of the expected delivery connection 320. An example of the file may include an audio file, a video file, and/or a file container, among others. The client application 303 may drop the expected delivery connection 320 if the delivery speed 322 through the expected delivery connection 320 falls below the minimum speed threshold 326. To prevent such a scenario, the delivery speed 322 may be matched to the minimum speed threshold 326 to maintain the expected delivery connection 320.

The inference engine 311 may determine the rapid and slow access portions (304 and 306) of the file 305 in relation to the file requester. The inference engine 311 may infer the file requester based on a property of the file 305. For example, a file owner (property of the file 305) may be inferred as the file requester. Alternatively, an entity that last accessed the file 305 may be inferred as the file requester. The file requester may also include the client application 303. Next, a bandwidth of the expected delivery connection 320 may be measured for providing the file 305 to the file requester. A size of the rapid access portion 304 and the slow access portion 306 of the file 305 may be adjusted based on die bandwidth of the expected delivery connection 320 prior to storage in the rapid access storage system 312 and the slow access storage system 316, respectively.

For example, in response to detecting the bandwidth of the expected delivery connection 320 exceed a bandwidth threshold, the delivery speed 322 of the rapid access portion of the file may be decreased to allow for a buffer of the slow access portion 306 of the file 305 to load. The buffer of the slow access portion 306 of the file 305 may also be increased to take advantage of the bandwidth by increasing the delivery speed 322 of the slow access portion 306. The delivery speed 322 of the slow access portion 306 of the file 305 may be increased because of the increased buffer that may sustain the increased delivery speed longer.

Alternatively, in response to detecting the bandwidth of the expected delivery connection 320 fall below the bandwidth threshold, the delivery speed 322 of the rapid access portion 304 of the file 305 may be increased because the smaller bandwidth may decrease the demand for a buffer of the slow access portion 306 of the file 305. The buffer of the slow access portion 306 of the file 305 may also be decreased because the smaller bandwidth may decrease the demand for the buffer of the slow access portion 306 of the file 305.

In another scenario, if the storage service 302 completes loading the slow access portion 306 of the file 305 to a buffer then the storage service 302 may increase the delivery speed 322 of the buffer of the slow access portion 306 for a delivery of the slow access portion 306 as fast as possible to the client application 303. The delivery speed 322 of the buffer of the slow access portion 306 of the file 305 may be increased to match an available bandwidth of the expected delivery connection 320.

Figure 4:
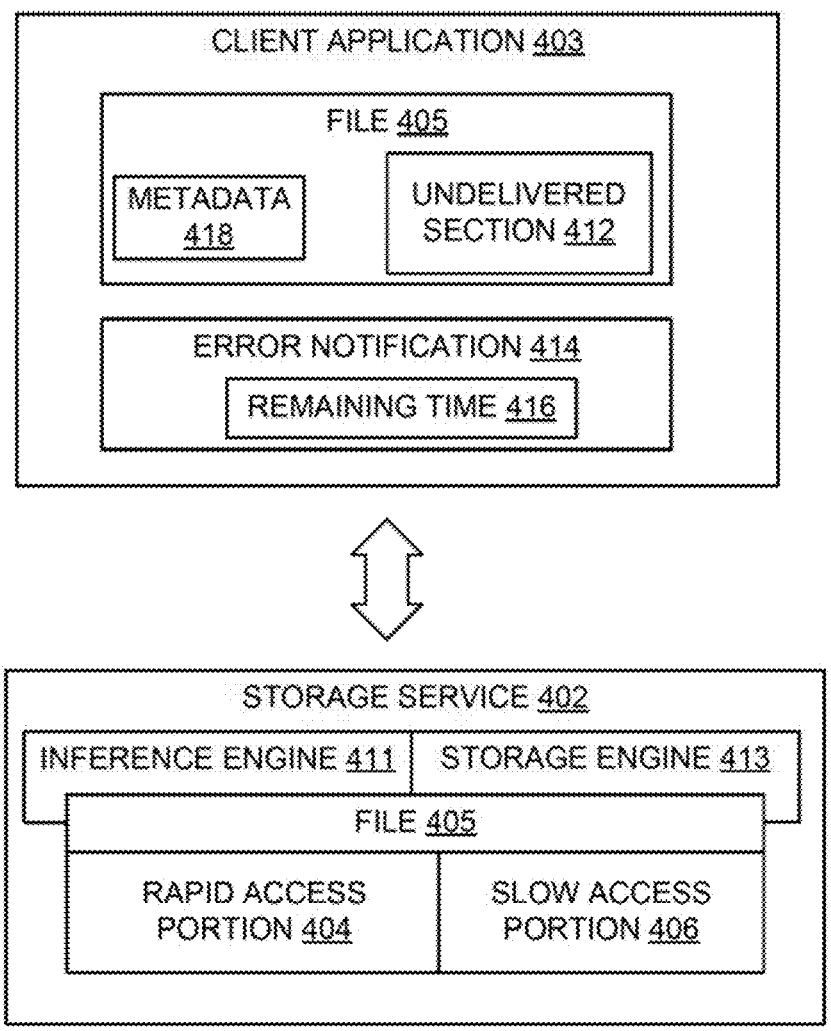
FIG. 4 is a display diagram illustrating error handling by a storage service configured to provide partial storage of large files in distinct storage systems, according to embodiments.

FIG. 4 is a display diagram illustrating error handling by a storage service configured to provide partial storage of large files in distinct storage systems, according to embodiments.

As shown in a diagram 400, an inference engine 411 of a storage service 402 may detect an attempt to access an undelivered section 412 of the slow access portion 406 of the file 405. For example, a file requester may attempt to fast forward to a section of a video file that is within the slow access portion 406 that a storage engine 413 has not streamed to the client application 403. In such a scenario, the storage engine 413 may generate an error notification 414 describing a failure to deliver the undelivered section 412 of the slow access portion 406 of the file 405. The error notification 414 may be provided to the client application 403 for rendering to the file requester. The storage engine 413 may also include a remaining time to deliver the undelivered section 412 of the slow access portion 406 of the file 405 within the error notification 414.

Furthermore, the inference engine 411 may detect metadata 418 within a section of the slow access, portion 406 of the file 405. Metadata associated with the file 405 may be important to the client application 403 to accurately stream and load the file 405 with processes associated with the file 405. As such, the metadata 418 may be misplaced in the slow access portion 406. In response to detecting the metadata 418 in the slow access portion 406, the section of the slow access portion 406 of the file 405 (encapsulating the metadata 418) may be moved from a slow access storage system to the rapid access portion 404 within a rapid access storage system.

Moreover, the inference engine 411 may also infer an expected access request for the other file(s) based on the access request for the file 405. Usage pattern(s) associated with the file requester may be analyzed to infer the additional access request. In response to the inference, a storage engine 413 of the storage service 402 may retrieve other slow access portion(s) of the other file(s) from the slow access storage system for providing the other slow access portion(s) of the other file(s) to the file requester. The slow access storage system may be notified to transmit the slow access portion(s) of the other file(s). For example, the inference engine 411 may infer the expected access request for the other file based on the file 405 and the other file being stored in a same folder.

As discussed above, the storage service may be employed to perform operations to automate partial storage of large files in distinct storage systems. An increased performance and efficiency improvement with the storage service 102 may occur as a result of storing and accessing a rapid access portion of a file through a rapid access storage system and a slow access portion of the file through a slow access storage system. Long term storage of the slow access portion of the file may be delegated to the slow access storage system to preserve storage resources at the rapid access storage system while providing access to the file on demand through the rapid access portion of the file. Additionally, providing the rapid and slow access portions of the file, by the storage service 102, may reduce processor load, increase processing speed, conserve memory, and reduce network bandwidth usage.

Embodiments, as described herein, address a need that arises from a lack of efficiency to provide partial storage of large files in distinct storage systems. The actions/operations described herein are not a mere use of a computer, but address results that are a direct consequence of software used as a service offered to large numbers of users and applications.

The example scenarios and schemas in FIG. 1 through 4 are shown with specific components, data types, and configurations. Embodiments are not limited to systems according to these example configurations. Providing partial storage of large files in distinct storage systems may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
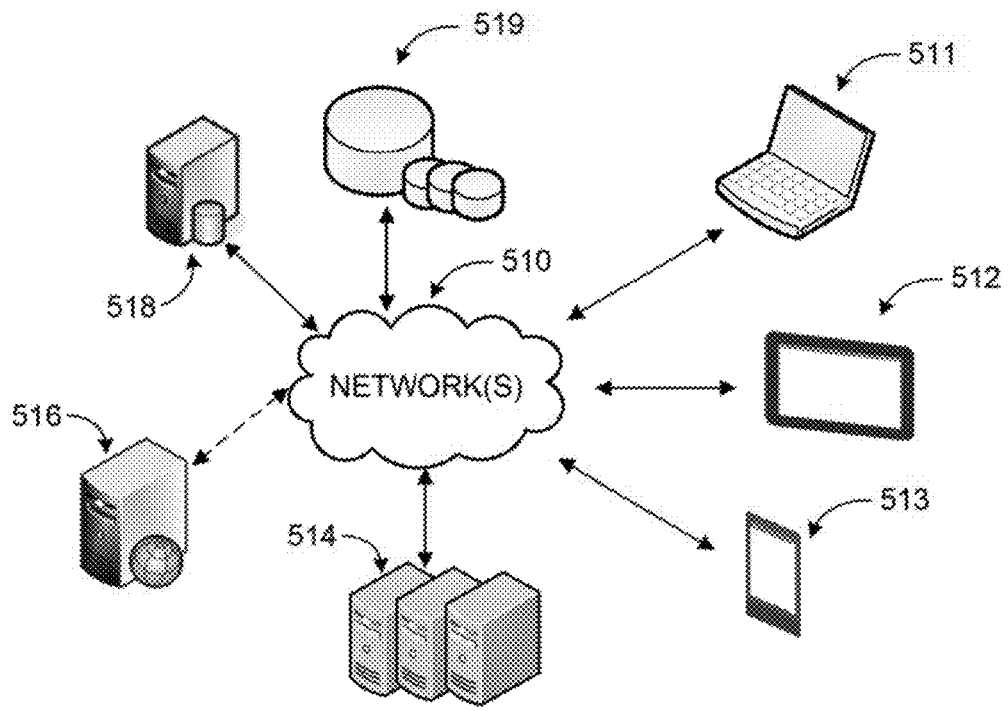
FIG. 5 is a simplified networked environment, where a system according to embodiments may be implemented.

FIG. 5 is an example networked environment, where embodiments may be implemented. A storage service configured to provide partial storage of large files may be implemented via software executed over one or more servers 514 such as a hosted service. The platform may communicate with client applications on individual computing devices such as a smart phone 513, a mobile computer 512, or desktop computer 511 ('client devices') through network(s) 510.

Client applications executed on any of the client devices 511-513 may facilitate communications via application(s) executed by servers 514, or on individual server 516. A storage service may determine a rapid access portion and a slow access portion of a file. The rapid access portion of the file may be stored in a rapid access storage system and the slow access portion of the file or an entirety of the file may be stored in a slow access storage system. In response to an access request to the file, the rapid access portion of the file may be provided. Next, the slow access portion of the file may be retrieved from the slow access storage system to be provided while providing the rapid access portion of the file. The storage service may store data associated with the file in data store(s) 519 directly or through database server 518.

Network(s) 510 may comprise any topology of servers, clients, Interact service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to provide partial storage of large files in distinct storage systems. Furthermore, the networked environments discussed in FIG. 5 are for illustration purposes only. Embodiments are not limited to the example applications, modules, or processes.

Figure 6:
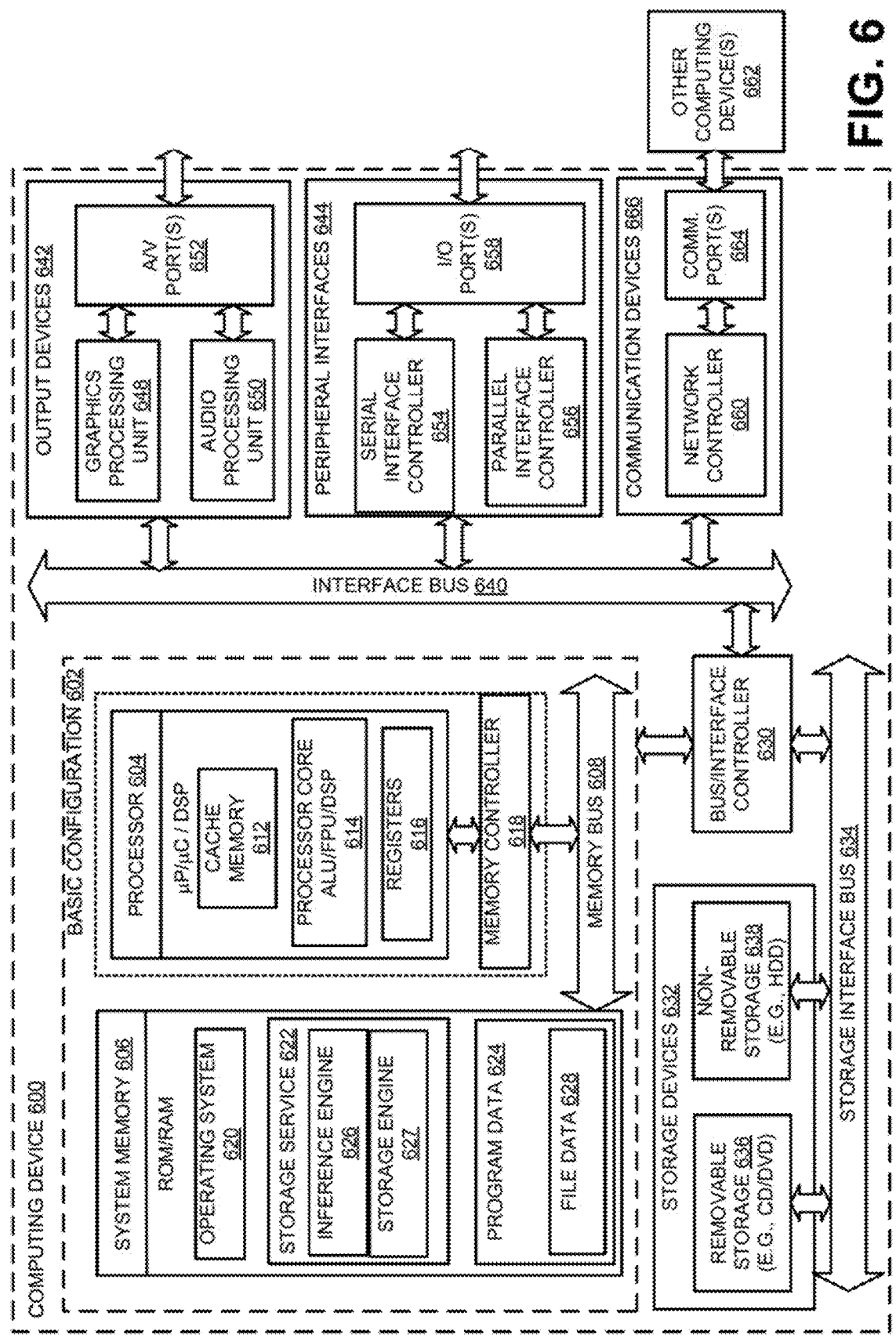
FIG. 6 is a block diagram of an example computing device, which may be used to provide partial storage of large files in distinct storage systems, according to embodiments.

FIG. 6 is a block diagram of an example computing device, which may be used to provide partial storage of large files in distinct storage systems, according to embodiments.

For example, computing device 600 may be used as a server, desktop computer, portable computer, smart phone, special purpose computer, or similar device. In an example, basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including but not limited to a microprocessor (μP), a microcontroller (μC), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU) a digital signal processing core (DSP Core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating, system 620, a storage service 622, and a program data 624. The storage service 622 may include a component such as an inference engine 626 and a storage engine 627. The inference engine 626 and the storage engine 627 may execute the processes associated with the storage service 622. The inference engine 626 may determine a rapid access portion and a slow access portion of a file. The storage engine 627 may store the rapid access portion of the file in a rapid access storage system and the slow access portion of the file (or an entirety of the file) in a slow access storage system. In response to an access request to the file, the rapid access portion of the file may be provided. Next, the slow access portion of the file may be retrieved from the slow access storage system to be provided while providing the rapid access portion of the file.

Input to and output out of the storage service 622 may be transmitted through a communication module associated with the computing device 600. An example of the communication module may include a communication device 666 that may be communicatively coupled to the computing device 600. The communication module may provide wired and/or wireless communication. The program data 624 may also include, among other data, file data 628, or the like, as described herein. The file data 628 may include a rapid access portion, and/or a slow access portion, among others.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or mare data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDDs), optical disk drives such as compact disk (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which ma be configured to communicate with external devices such as input devices (for example, keyboard, mouse, pen, voice input device, touch input device, etc.) or other peripheral devices (for example, printer, scanner, etc.) via one or more I/O ports 658. An example of the communication device(s) 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transom mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations. Additionally, the computing device 600 may include specialized hardware such as an application-specific integrated circuit (ASIC), a field programmable gate array (FPGA), a programmable logic device (PLD), and/or a free form logic on an integrated circuit (IC), among others.

Example embodiments may also include methods to provide partial storage of large files in distinct storage systems. These methods can the implemented in any number of ways, including the structures described herein. One such way may be by machine operations, of devices of the type described in the present disclosure. Another optional way may be for one or more of the individual operations of die methods to be performed in conjunction with one or more human operators performing some of the operations while other operations natty be performed by machines. These human operators need not be collocated with each other, but each can be only with a machine that performs a portion of the program. In other embodiments, the human interaction can be automated such as by pre-selected criteria that may be machine automated.

Figure 7:
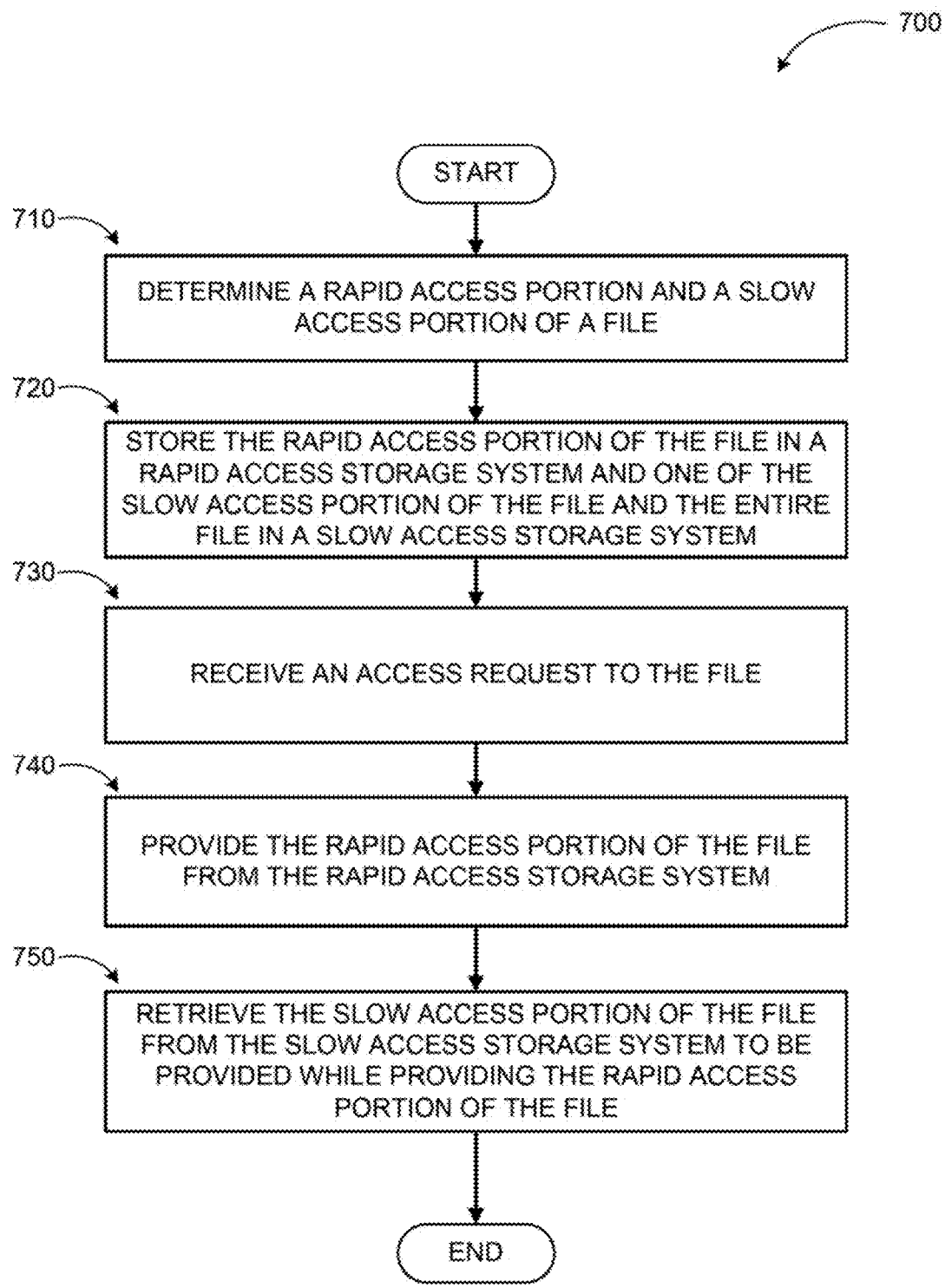
FIG. 7 is a logic flow diagram illustrating a process for providing partial storage of large files in distinct storage systems, according to embodiments.

FIG. 7 is a logic flow diagram illustrating a process for providing partial storage of large files in distinct storage systems, according to embodiments. Process 700 may be implemented on a computing device, such as the computing device 600 or another system.

Process 700 begins with operation 710, where the storage service may determine a rapid access portion and a slow access portion of a file. A size of the rapid and slow access portions may be determined based on a bandwidth of a predicted connection. A size of the rapid access portion may be increased or decreased as the bandwidth increases or decreases while the size of the slow access portion is decreased or increased. Next, at operation 720, the rapid access portion of the file may be stored in a rapid access storage system and the slow access portion of the file (or an entirety of the file) may be stored in a slow access storage system.

At operation 730, the storage service may receive an access request for the file. At operation 740, the rapid access portion of the file may be provided from the rapid access storage system to start streaming the file. At operation 750, the slow access portion off the file may be retrieved from the slow access storage system to be provided while providing the rapid access portion of the file. The slow access portion of the file may also be streamed upon streaming the rapid access portion of the file.

The operations included in process 700 is for illustration purposes. Providing partial storage of large files in distinct storage systems may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

In some examples, a method executed on a computing device to provide partial storage of large files in distinct storage systems is described. The method includes determining a rapid access portion and a slow access portion of a file, storing the rapid access portion of the file in a rapid access storage system and one of the slow access portion of the file and an entirety of the file in a slow access, storage system, receiving an access request to the file, providing the rapid access portion of the file from the rapid access storage system, and retrieving the slow access portion of the file from the slow access storage system to be provided while providing the rapid access portion of the file.

In other examples, the method further includes adjusting a delivery speed of the rapid access portion of the file such that the slow access portion is retrieved about entirely when a delivery of the rapid access portion is completed. The method further includes determining a minimum speed threshold for providing the rapid access portion of the file and the slow access portion of the file and adjusting a delivery speed of the rapid access portion and the slow access portion of the file to match the minimum speed threshold. Adjusting the delivery speed of the rapid access portion and the slow access portion of the file includes matching the minimum speed threshold by reducing the delivery speed of the rapid access portion, buffering the slow access portion while delivering the rapid access portion, and transmitting the buffered slow access portion at the delivery speed that matches the minimum speed threshold. The method further includes identifying a minimum streaming speed property of the file, wherein the file includes one of an audio file and a video file and configuring the minimum speed threshold to match the minimum streaming speed.

In further examples, the method further includes storing the rapid access portion of the file in the rapid access storage system and one of the slow access portion of the file and the entirety of the file in the slow access storage system based at least on a size of the file and a last access time of the file. The method further includes inferring a file requester based on a property of the file, determining a bandwidth for an expected delivery connection for providing the file to the file requester, and adjusting a size of the rapid access portion of the file for storage in the rapid access storage system and the slow access portion of the file fir storage in the slow access storage system based on the bandwidth for the expected delivery connection. The method further includes determining the bandwidth for the expected delivery connection to exceed a bandwidth threshold, decreasing a delivery speed of the rapid access portion of the file, and increasing a buffer of the slow, access portion of the file. The method further includes determining the bandwidth for the expected delivery connection to fall below a bandwidth threshold, increasing a delivery speed of the rapid access portion of the file, and decreasing a buffer of the slow access portion of the file.

In other examples, the method further includes detecting at least one access request to the file before an expected access period and storing the slow access portion of the file in the rapid access storage system. The method further includes detecting no access requests to the file for the expected access period following a storage of the slow access portion of the file in the rapid access storage system and storing the slow access portion of the file in the slow access storage system.

In some examples a server configured to provide partial storage of large files in distinct storage systems is described. The server includes a communication module configured to facilitate communication between a storage service and one or more devices on which a file is locally stored, a memory configured to store instructions, and a processor coupled to the memory and the communication module. The processor executing the storage service in conjunction with the instructions stored in the memory. The storage service includes an inference engine and a storage engine. The inference engine is configured to determine an expected access period for the file and determine a rapid access portion and a slow access portion of the file based at least on a size of the file and the expected access period of the file. The storage engine is configured to store the rapid access portion of the file in a rapid access storage system and one of the slow access portion of the file and the entirely of the file in a slow access storage system, receive an access request to the file, provide the rapid access portion of the file from the rapid access storage system, retrieve the slow access portion of the file from the slow access storage system to be provided while providing the rapid access portion of the file, and provide the slow access portion such that a delay in delivery is not detectable.

In other examples, the inference engine is further configured to infer an expected access request for other file based on the access request for the file. The storage engine is further configured to retrieve a slow access portion of the other file from the slow access storage system. The inference engine is further configured to infer the expected access request for the other file based on the file and the other file being stored in a same folder. The inference engine is further configured to detect an attempt to access an undelivered section of the slow access portion of the file, generate an error notification, and provide the error notification. The error notification includes a remaining time to deliver the undelivered section of the slow access portion of the file. The inference engine is further configured to detect an available bandwidth for a transmission of the rapid access portion of the file and the slow access portion of the file and increase a delivery speed of the rapid access portion of the file and the slow access portion of the file based on the available bandwidth.

In some examples, a method executed on a computing device to provide partial storage of large files in distinct storage systems is described. The method includes determining two or more portions of a file to be stored in two or more storage systems, determining an expected delivery speed for the entirety of the file, storing the two or more portions of the file in the two or more storage systems based on the expected delivery speed for the entirety of the file, receiving an access request to the file, providing one of the two or more portions of the file from one of the two or more storage systems with faster access speed compared to a remainder of the two or more storage systems, and retrieving a remainder of the two or more portions of the file from the remainder of the two or more storage systems with slower access speeds compared to the one of the two or more storage systems while providing the one of the two or more portions of the file.

In other examples, the one of the two or more portions of the file is a header section of the file. The remainder of the two or more portions of the file includes at least a middle section and a tail section of the file.

In some examples, a means for providing partial storage of large files in distinct storage systems is described. The means for providing partial storage of large files in distinct storage systems includes a means for determining a rapid access portion and a slow access portion of a file, a means for storing the rapid access portion of the file in a rapid access storage system and one of the slow access portion of the file and an entirety of the file in a slow access storage system, a means for receiving an access request to the file, a means for providing the rapid access portion of the file from the rapid access storage system, and a means for retrieving the slow access portion of the file from the slow access storage system to be provided while providing the rapid access portion of the file.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to provide partial storage of large files in distinct storage systems, the method comprising:
   determining a rapid access portion and a slow access portion of a file;
   storing the rapid access portion of the file in a rapid access storage system and one of the slow access portion of the file and an entirety of the file in a slow access storage system;
   receiving an access request to the file;
   providing the rapid access portion of the file from the rapid access storage system;
   retrieving the slow access portion of the file from the slow access storage system to be provided while providing the rapid access portion of the file;
   determining a minimum speed threshold for providing the rapid access portion of the file and the slow access portion of the file; and
   reducing the delivery speed of the rapid access portion to match the minimum speed threshold.

2. The method of claim 1, further comprising:
   adjusting the delivery speed of the rapid access portion and the slow access portion of the file to match the minimum speed threshold.

3. The method of claim 2, wherein adjusting the delivery speed of the rapid access portion and the slow access portion of the file comprises:
buffering the slow access portion while delivering the rapid access portion; and
transmitting the buffered slow access portion at the delivery speed that matches the minimum speed threshold.

4. The method, of claim 2, further comprising:
identifying a minimum streaming speed property of the file, wherein the file includes one of: an audio file and a video file.

5. The method of claim 1, further comprising:
storing the rapid access portion of the file in the rapid access storage system and one of the slow access portion of the file and the entirety of the file in the slow access storage system based at least on a size of the file and a last access time of the file.

6. The method of claim 1, further comprising:
inferring a file requester based on a property of the file;
determining a bandwidth for an expected delivery connection for providing the file to the file requester; and
adjusting a size of the rapid access portion of the file for storage in the rapid access storage system and the slow access portion of the file for storage in the slow access storage system based on the bandwidth for the expected delivery connection.

7. The method of claim 6, further comprising:
determining the bandwidth for the expected delivery connection to exceed a bandwidth threshold;
increasing a buffer of the slow access portion of the file.

8. The method of claim 6, further comprising:
determining the bandwidth for the expected delivery connection to fall below a bandwidth threshold;
increasing the delivery speed of the rapid access portion of the file; and
decreasing a buffer of the slow access portion of the file.

9. The method of claim 1, further comprising:
detecting at least one access request to the file before an expected access period; and
storing the slow access portion of the file in the rapid access storage system.

10. The method of claim 9, further comprising:
detecting no access requests to the file for the expected access period following a storage of the slow access portion of the file in the rapid access storage system; and
storing the slow access portion of the file in the slow access storage system.

11. A server configured to provide partial storage of large files in distinct storage systems, the server comprising:
a communication module configured to facilitate communication between a storage service and one or more devices on which a file is locally stored;
a memory configured to store instructions; and
a processor coupled to the memory and the communication module, the processor executing the storage service in conjunction with the instructions stored in the memory, wherein the storage service includes:
an inference engine configured to:
determine an expected access period for the file;
determine a rapid access portion and a slow access portion of the file based at least on a size of the file and the expected access period of the file;
a storage engine configured to:
store the rapid access portion of the file in a rapid access storage system and one of the slow access portion of the file and the entirety of the file in a slow access storage system;
receive an access request to the file;
provide the rapid access portion of the file from the rapid access storage system;
retrieve the slow access portion of the file from the slow access storage system to be provided while providing the rapid access portion of the file;
determine a minimum speed threshold for providing the rapid access portion of the file and the slow access portion of the file; and
reduce the delivery speed of the rapid access portion to match the minimum speed threshold.

12. The server of claim 11, wherein
the inference engine is further configured to:
infer an expected access request for other file based on the access request for the file; and
the storage engine is further configured to:
retrieve a slow access portion of the other the from the slow access storage system.

13. The server of claim 12, wherein the inference engine is further configured to infer the expected access request for the other file based on the file and the other file being stored in a same folder.

14. The server of claim 11, wherein the inference engine is further configured to:
detect an attempt to access undelivered section of the slow access portion of the file;
generate an error notification; and
provide the error notification.

15. The server of claim 14, wherein the error notification includes a remaining time to deliver the undelivered section of the slow access portion of the file.

16. The server of claim 11, wherein the inference engine is further configured to:
detect an available bandwidth for a transmission of the rapid access portion of the file and the slow access portion of the file; and
increase a delivery speed of the rapid access portion of the file and the slow access portion of the file based on the available bandwidth.

17. A method executed on a computing device to provide partial storage of large files in distinct storage systems, the method comprising:
determining two or more portions of a file to be stored in two or more storage systems;
determining an expected delivery speed for the entirety of the file;
storing the two or more portions of the file in the two or more storage systems based on the expected delivery speed for the entirety of the file;
receiving an access request to the file;
providing one of the two or more portions of the file from one of the two or more storage systems with faster access speed compared to a remainder of the two or more storage systems;
retrieving a remainder of the two or more portions of the file from the remainder of the two or more storage systems with slower access speeds compared to the one of the two or more storage systems while providing the one of the two or more portions of the file;
determining a minimum speed threshold for providing the one of the two or more portions of the file and another of the two or more portions of the file; and
reducing the delivery speed of one of the two or more portions of the file to match the minimum speed threshold.

18. The method of claim 17, wherein the one of the two or more portions of the file is a header section of the file.

19. The method of claim 17, wherein the remainder of the two or more portions of the file includes at least a middle section and a tail section of the file.

\* \* \* \* \*